US012601931B2

(12) United States Patent
Gallas et al.

(10) Patent No.: US 12,601,931 B2
(45) Date of Patent: Apr. 14, 2026

(54) PHOTO-BIOMODULATION BY ENDOGENOUS AUTO-FLUORESCENT COMPOUNDS

(71) Applicant: Photoprotective Technologies Incorporated, San Antonio, TX (US)

(72) Inventors: James M. Gallas, San Antonio, TX (US); Matthew T. Gordon, Schertz, TX (US)

(73) Assignee: Photoprotective Technologies Incorporated, San Antonio, TX (US)

( * ) Notice: Subject to any disclaimer, the term of this patent is extended or adjusted under 35 U.S.C. 154(b) by 964 days.

(21) Appl. No.: 16/627,281

(22) PCT Filed: Jan. 30, 2018

(86) PCT No.: PCT/US2018/015845

§ 371 (c)(1),
(2) Date: Dec. 27, 2019

(87) PCT Pub. No.: WO2019/005215

PCT Pub. Date: Jan. 3, 2019

(65) Prior Publication Data

US 2020/0133027 A1 Apr. 30, 2020

Related U.S. Application Data

(63) Continuation of application No. 15/635,135, filed on Jun. 27, 2017, now abandoned, which is a continuation-in-part of application No. 14/331,147, filed on Jul. 14, 2014, now Pat. No. 9,726,910.

(60) Provisional application No. 61/957,818, filed on Jul. 12, 2013, provisional application No. 61/957,826, filed on Jul. 12, 2013.

(51) Int. Cl.
| | |
|---|---|
| *G02C 7/10* | (2006.01) |
| *G02B 5/20* | (2006.01) |
| *G02B 5/22* | (2006.01) |

(52) U.S. Cl.
CPC ............. *G02C 7/104* (2013.01); *G02B 5/208* (2013.01); *G02B 5/223* (2013.01); *G02C 7/108* (2013.01)

(58) Field of Classification Search
CPC ........ G02C 7/104; G02C 7/108; G02B 5/208; G02B 5/223
See application file for complete search history.

(56) References Cited

U.S. PATENT DOCUMENTS

2004/0042072 A1* 3/2004 Gallas ................... G02B 1/041
359/356
2013/0078205 A1* 3/2013 Dayan ................... A61P 17/00
424/59

OTHER PUBLICATIONS

Skoczynska et al. (Adv. Dermatol Allergol 2017, XXXIV 9(2) 97-103) discloses (Year: 2017).*

* cited by examiner

*Primary Examiner* — Genevieve S Alley

(57) ABSTRACT

According to the present invention, light filters are disclosed that provide photoprotection and contain fluorescent agents in that have fluorescence emission in the near infrared region of wavelengths to effect photobiological modulation (PBM) of human cells when the cells are exposed to sunlight or any artificial lighting. The fluorescent agents include endogenous compounds. The light filters include ophthalmic lenses, skin care products with or without transparent substrate and any products that are used to filter light. When used in connection with ophthalmic lenses, the ophthalmic lense provides photoprotection and photobiological modulation to the human eye.

1 Claim, 16 Drawing Sheets

Figure 1. The solar intensity as a function of wavelength.

Figure 2.  Proposed action spectra for cytochrome-C.  Absorption spans the red to near IR range of wavelengths.

Figure 3. Absorption and Emission spectra of a commercially available fluorophore.

Figure 4. Emission spectrum measured from a suspension of single-walled carbon.

Figure 5. Absorption and Emission spectra of a commercially available fluorophore.

Figure 6

Figure 7     Fluorescence Emission Spectra of Retinal

Figure 8 Tryptophan control in EtOH

Figure 11  Fluorescence Emission Spectra of  OLP-Retinal Coating

Figure 12 Fluorescence Emission Spectra of OLP-retinal Coating with Melanin Filter Figure 9 Fluorescence Emission Spectraof A2E in Ethanol Figure 10 Fluorescence Emission Spectra
A2E in Acrylic Film

PHOTO-BIOMODULATION BY ENDOGENOUS AUTO-FLUORESCENT COMPOUNDS

RELATED APPLICATIONS

This application is a continuation in part application of US application Ser. No. 14/331,147, filed Jul. 14, 2014, entitled "Phototherapeutic Near IR Fluorescent Ophthalmic Lenses and Light Filters" which claims the benefit under 35 U.S.C. 119(e) of the U.S. provisional application No. 61/957,818 filed on Jul. 12, 2013 and of the U.S. provisional application No. 61/957,826 filed on Jul. 12, 2013.

TECHNICAL FIELD OF THE INVENTION

The present invention relates to eye protection and more particularly to light filters including ophthalmic lenses containing fluorescent compounds that absorb light in the UV and visible region of wavelengths and that have fluorescence emission in selected wavelength regions of the red and near infrared in order to enhance phototherapy for the human eye when it is exposed to sunlight and artificial lighting. Further, the present invention relates to the use of fluorescent compounds that are the reaction products of chromophores and fluorophores that are endogenous to humans and animals and that have a fluorescence that displays phototherapy which is also referred to as photo-biomodulation.

BACKGROUND OF THE INVENTION

Light filters for the protection of the eyes from ultraviolet ("UV") light are well known and the subject of a large number of patents, publications and products. Further, light filtering agents for sun screens that filter primarily UV light are disclosed in U.S. Pat. Nos. 4,889,947, 4,950,467, and 8,278,459. A pending U.S. application Ser. No. 14/701,510, filed on Apr. 30, 2015 entitled, "Compound, Composition, and Method for Protecting Skin from High Energy Visible Light" describes the use of melanin with enhance absorption of HEV light and enhanced transmission of red light for skin care applications. A pending U.S. application Ser. No. 12/807,656) describes the use of melanin as an ideal light filter that optimizes protection, vision and NIR-based therapy as indicated by its transmission spectrum shown in FIG. 1.

In each of the above cases, the light filtering agents reduce the risk of damage due to photochemistry of tissue that is associated with the higher energy photons—400 nm to 500 nm and they transmit red and near infrared light. Further, any light that is absorbed by the protective light filters is converted into heat through radiationless transitions from the excited states rather than through fluorescence, for example.

Although many filters have been used to reduce the damage to the eye or the skin, none of those filters provide a mechanism for regenerating the destroyed tissue of the eye or the skin. According to the present invention, a light filter is disclosed that protects the eye and the skin from damage while at the same time it regenerates the tissue of the eye or the skin.

The current invention has particular value when applied as light filters for electronic displays and LED light sources because these light sources emit disproportionately more damaging blue light and less therapeutic red light—and no near infrared light—in comparison to sunlight or to incandescent light currently being phased out by the lighting industry. The current invention will allow, for example, conversion of some of the light between 400 nm and 600 nm into therapeutic red and near infrared light at wavelengths longer than 700 nm.

These and other advantages of the present invention will become apparent from the following description and drawings.

BRIEF SUMMARY OF THE INVENTION

According to the present invention, the intensity of the red and near IR photons from sunlight that reach the eye is increased beyond what is directly emitted by sunlight by the use of fluorescent compounds. The increase is effected wherein light is absorbed and then emitted in specific wavelength regions by the fluorescent compounds so as to provide photo-therapy for the eye.

Appropriate fluorescent compounds having the appropriate absorption and emission spectra are incorporated into light filters and skin care products to provide photo-therapy. The fluorescent compounds selectively absorb UV, HEV and visible light and convert the excited state energy associated with this absorption into fluorescence. The fluorescence emission spans the wavelength range primarily from 600 nm to 1200 nm.

Fluorescent compounds, modifications thereof or combinations thereof may be used as fluorophores to emit the absorbed light in the wavelengths where phototherapy may be effected.

In a preferred embodiment, the present invention utilizes fluorophores and/or chromophores which are endogenous to humans or modifications thereof as fluorescent agents to effect PBM in a broad wavelength range. Those compounds preferably react with each other and the resultant product has the desirable fluorescence emission spectra to effect phototherapy. Further, endogenous fluorophores that already display PBM auto-fluorescence are used.

Phosphores may be used instead of fluorophores. According to the present invention, light filters are disclosed having transparent substrates with the UV and HEV absorbing fluorophores or the UV and HEV absorbing phosphores placed on the surface of the substrate or incorporated in the substrate. In the case of skin care products, the fluorophores or phosphores are preferably incorporated in the substrate.

BRIEF DESCRIPTION OF THE DRAWINGS

For a detailed description of the preferred embodiment of the invention, reference will now be made to the accompanying drawings wherein:

FIG. 6 shows the general structure of the A2X compound in accordance with the present invention wherein R is an endogenous, amine-containing chromophore selected to react with retinal. R can be: melanin derived from tyrosine, L-dopa or other melanin precursors; Ocular lens pigment derived from 3-hydroxykynurenine or from tryptophan; amino acids or other amine containing monomeric units, including but not limited to Trp, 3OHK, Tyr, 5-HTP, Tryptamine;

DETAILED DESCRIPTION OF THE INVENTION

Figure 1:
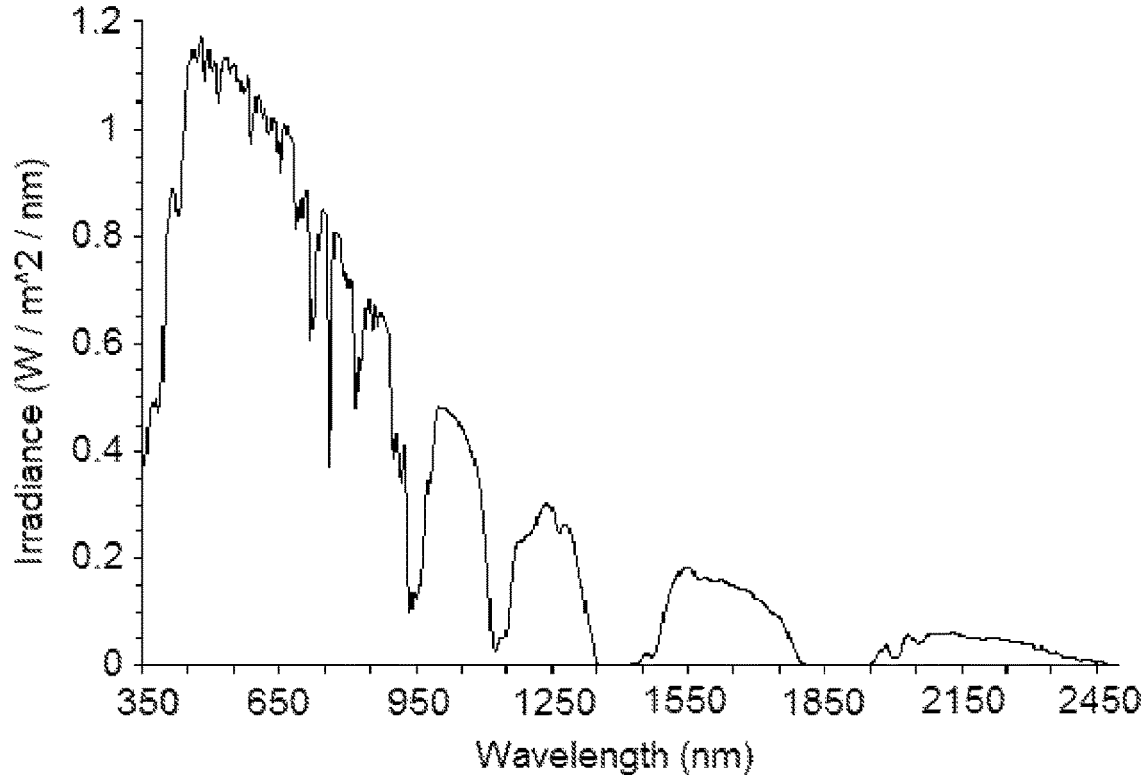
FIG. 1 is a graph that shows the solar intensity as a function of wavelength wherein it is shown that sunlight that reaches the human skin contains solar energy composed of 6.8% ultraviolet light, 38.9% visible light, and 54.3% infrared radiation.

As used herein the various terms shall have the following definitions:

Definitions

Ophthalmic Lenses. Ophthalmic lenses shall mean any lens that is utilized in connection with the eye or eyewear and includes, but is not limited to, lenses for sunglasses, reading glasses, computer glasses, ski goggles, visors, wearover glasses, clip-on glasses, contact lenses and intraocular lenses. Ophthalmic lenses include lenses that correct the vision and plano lenses that do not provide correction.

Skin Care Products. Skin care products shall mean cream or lotion products that are applied to the skin for the purpose of filtering UV and visible light including, but not limited to cosmetics and sunscreens and shampoos.

Light Filters. Light filters shall mean any transparent filter that reduces the light (or some wavelengths of the light) passing through it. Light filters include, but are not limited, to Ophthalmic Lenses, Skin Care Products and any products that are used to filter light such as (a) films, coatings or covers on or for electronic devices that emit light from their electronic display screens such as computer monitors, telephones, televisions, tablets, or the like; (b) filters that filter light emitted from electronic visual displays such as computer screens, telephone screen, tablet screen, television screens, watch screen, or the like; (c) filters to filter light in windows of any kind (building windows, automobile windows, airplane windows, etc.); (d) filters to filter light from light fixtures such as LED or fluorescent light sources; (e) transparent umbrellas and canopies or the like; (f) head covers and helmets, etc.

UV. Ultraviolet (UV) light shall mean the electromagnetic radiation having wavelengths that span the region of about 200 nm to 400 nm. Very little sunlight has a component in the region between 200 nm and 300 nm.

HEV. High-energy visible light (HEV light) is high-frequency, high-energy light in the violet/blue band from 400 to 480 nm in the visible spectrum.

Luminescent materials. Luminescent materials shall mean materials that fluoresce or phosphoresce.

Melanin. Melanin is the pigment as defined in U.S. Pat. No. 5,112,883

Ocular Lens Pigment. Ocular Lens Pigment (OLP) is the pigment as defined in U.S. Pat. No. 6,825,975. It is the oligomerization product of 3-hydroxykynurenine. Further, Ocular Lens Pigment includes the oligomerization of tryptophan as an approximation to the oligomerization product of 3-hydroxykynurenine.

Auto-fluorescence means fluorescence from molecules that are naturally-occurring or endogenous to humans and even to plants and animals.

Photo-biomodulation (PBM) means a therapy that utilizes non-ionizing light sources that includes sun light, lasers, LEDs, and broadband light, in the visible and infrared spectrum to repair cells and tissue. It is a nonthermal process involving endogenous chromophores eliciting photophysical (i.e., linear and nonlinear) and photochemical events at various biological scales. This process results in beneficial therapeutic outcomes including but not limited to the alleviation of pain or inflammation, immunomodulation, and promotion of wound healing and tissue regeneration. See, J. J. Anders, R. J. Lanzafame, and P. R. Arany, "Low-Level Light/Laser Therapy Versus Photobiomodulation Therapy," Photomed Laser Surg., 33(4): 183-184, (2015).

Endogenous molecules of the human body means molecules or biological molecules that are known to be present in humans. Endogenous fluorescence and auto-fluorescence are used interchangeably in this application.

Endogenous chromophores means light-absorbing molecules in humans.

Fluorophores are molecules that absorb light and remit some fraction of the energy absorbed and in accordance with the Einstein A and B coefficients Quantum Yield of a Fluorophore is defined as the ratio of the number of photons emitted to the number of photons absorbed (# photons emitted/# photons absorbed); it is therefore a measure of the intensity of fluorescence by a fluorophore.

Eye Protection Factor for the Retina. The Eye Protection Factor (also known as EPF) for the human retina is the reciprocal of the transmission of light damaging to the retina, wherein the said transmission is a weighted average of the optical transmission spectrum of a given lens and wherein such weighting is from the action spectrum for retina damage and also from the emission spectrum of the source—all from 380 nm to 500 nm, and, in particular, according to the description of the EPF in the Elsevier monograph: J. M. Gallas and M. Eisner. Eye Protection From Sunlight Damage. In: P. Giacomoni (Ed). Sun Protection in Man. Elsevier, New York, 2001.

Chromophore means a molecule that absorbs electromagnetic radiation.

Fluorophore means a molecule that absorbs light and fluoresces.

Stokes shift means the difference between the absorption maximum of a fluorophore and its emission maximum.

Action Spectrum for PBM means the rate of a physiological activity plotted against wavelength of light. It shows which wavelength of light is most effectively used in a specific chemical reaction. It has been used interchangeably in this invention with absorption spectrum.

The following abbreviations are sometimes used with the corresponding meaning below:

Tyr means tyrosine.

Tryp means tryptophan.

Kyr means kynurenine.

A means retinal which is also known as retinaldehyde or vitamin A aldehyde.

Trp means tryptophan

A2E means N-Retinyliden-N-Retinylethanolamine

Figure 2:
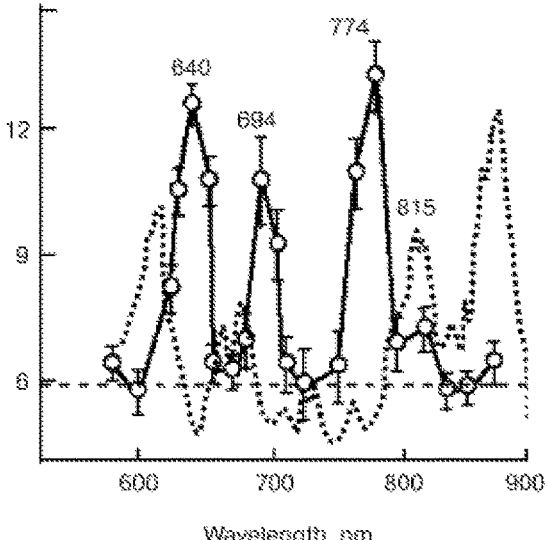
FIG. 2 is a graph that shows the action spectra for cytochrome-C wherein it is shown that absorption spans the red to near IR range of wavelengths.
Figure 16:
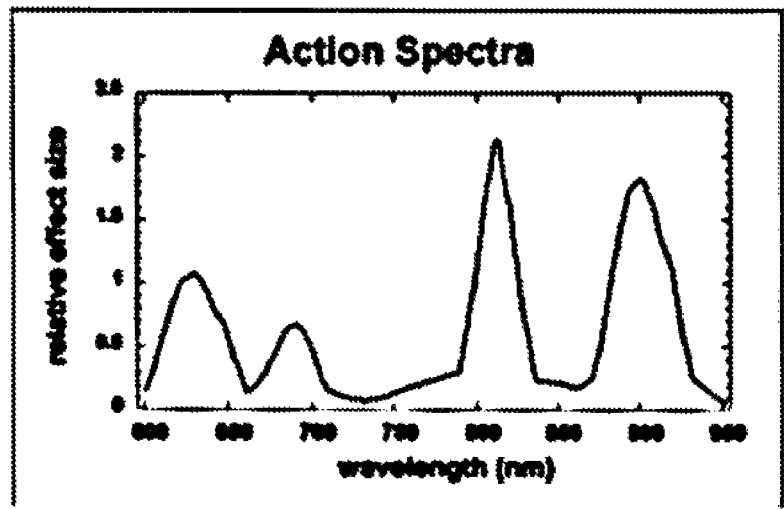
FIG. 16 is a graph that shows an action spectrum published in 2006 for PBM.

A2X means red fluorophore reaction product, composed of 2 retinal units and 1 amine-containing unit X means photoprotective endogenous chromophore, possessing an amine The terrestrial electromagnetic radiation from the sun (shown in FIG. 1) spans a region of wavelengths that includes the UV, the HEV (high energy visible), visible light and the near IR (near infrared). Direct sunlight that reaches the human eye contains solar energy composed of 6.8% ultraviolet light, 38.9% visible light, and 54.3% infrared radiation. It is well-known that exposure to the UV region of light increases the risks of damage to the skin and to the lens of the eye. In recent research, the HEV region of wavelengths have been associated with an increased risk for macular degeneration and also damage to the skin. The visible region is what is used by humans to see and get around. Still in more recent research, the near IR (NIR) part of the electromagnetic spectrum of wavelengths is believed to result in cellular repair or therapy. A molecular mechanism has been proposed for this repair that involves absorption of NIR light by cytochrome-C found in every cell (FIG. 2). The process is seen to energize the cells and initiate a therapeutic response of repair to the tissue. The action spectrum for cytochrome-C spans the wavelength range continuously from 700 nm to 1200 nm. Further it is recognized that PBM occurs over the wavelength region from at least 600 nm to 950 nm (Hamblin, M. and Demidova, T. Mechanisms of low light therapy SPIE 614001, February 2006). This is illustrated in FIG. 16.

According to the present invention, the intensity of the red and near IR photons from sunlight that reach the cornea, lens and retina of the human eye is increased beyond what is directly emitted by sunlight by the use of appropriate fluorescent compounds. The increase is effected wherein light is absorbed and then emitted in specific wavelength regions by the fluorescent compounds so as to provide photo-therapy for the eye.

Appropriate fluorescent compounds having the appropriate absorption and emission spectra are incorporated into light filters and skin care products to provide photo-therapy. The fluorescent compounds selectively absorb UV, HEV and visible light and convert the excited state energy associated with this absorption into fluorescence. The fluorescence emission spans the wavelength range primarily from 700 nm to 1200 nm—the wavelength region of absorption by cytochrome-C (FIGS. 3 and 4)—but to also include the region from 600 nm to 1200 nm. This NIR fluorescence is separate, distinct from, and over and above the NIR component of sunlight that is simply transmitted by the chromophores or fluorophores.

According to the present invention, in addition to other fluorescent dyes described below, endogenous fluorescent dyes that display PBM are utilized as well as fluorescent dyes that exhibit PBM are prepared and used by reacting endogenous dyes with each other. This inventive step is undertaken by the inventors' observation that certain molecules, endogenous to humans, display potential photobiomodulation—typically at advanced ages—by virtue of their fluorescence emission spectra. Accordingly, light from the UV and visible parts of the electromagnetic spectrum of sunlight reaches the lens and retina where it is absorbed and re-emitted as fluorescence by such molecules and where emission occurs within wavelength ranges where PBM has been documented by scientists who have used artificial, LED light sources to empirically observes PBM effects on cells and tissues. For example, A2E, a compound found in lipofuscins of the retinal pigment epithelium, absorbs light in the UV and visible region of wavelengths and fluoresces light in the red and near infrared wavelengths.

Some of these auto-fluorescent PBM molecules are unknown in origin. For example, a red fluorescent biomolecule is known to occur in the lens of the eye—but only in the seventh decade of life. This red fluorescence—with a maxima at 672 nm—was observed and published in 1979. This wavelength of light is able to repair cells and tissue. Recently, a medical research group used the light from a red, 670 nm LED (light-emitting diode) to regenerate damaged photoreceptors.

According to the present invention, endogenous auto-fluorescent molecules are operating in the human body with a PBM role—in effect, displaying auto-fluorescence-based PBM. According to the present invention, molecules that are known to be endogenous to human physiology but do not display PBM fluorescence alone are reacted with each other to form a product which is fluorescent with PBM properties.

According to the present invention, naturally-occurring endogenous red light- and near IR-fluorescing may have evolved to emit light in regions of wavelengths associated with PBM and at quantum yields that are more effective for PBM than the absorption bands of cytochrome-C previously reported and also whose chemical structures have yet to be discovered or identified. A novel aspect of this invention is that some molecules endogenous to human proteins, pigments, cells and tissue, become auto-fluorescent by their mutual chemical reactions, and moreover, this fluorescence can correspond to wavelength bands and intensities associated with PBM. Applicants believe that these biochemical reactions, that lead to endogenous fluorescence that display PBM, may be the result of an evolutionary process that is directed to repair of human tissue.

Some of the endogenous fluorophores according to the present invention that display PBM also display a large Stokes shift. Another feature of this invention is that a large Stokes shift opens the possibility to achieve both photoprotection and photo-biomodulation in a single compound.

According to the present invention, light filters utilizing fluorescent dyes similar to the naturally-occurring PBM that occurs to people only later in life are disclosed.

Luminescence is a physical process whereby an electron is excited by a photon with de-excitation occurring almost spontaneously and whereby emission from a luminescent substance ceases when the exciting source is removed. In fluorescent materials, the excited state has the same spin as the ground state. If denotes an excited state of a substance A, then fluorescence consists of the emission of a photon, $$A^* \rightarrow A + h\nu,$$

In phosphorescence, there is a change in electron spin, which results in a longer lifetime of the excited state (second to minutes). It is an essential point of this invention that fluorescence and phosphorescence occur at longer wavelength than the excitation radiation. More specifically, if a molecule or compound absorbs UV or HEV (high energy visible) light, then emission can occur at longer-wavelength red light. Furthermore, some specific substances are able to fluoresce selectively in the range of wavelengths from 700 nm to 1200 nm. This range of wavelengths from 700 nm to 1200 nm is absorbed by cytochrome C and the process is associated with energizing cells and the repair of human tissue.

An essential object of this invention is to increase the intensity of the near Infrared (NIR) light that reaches the cornea, lens and retina of the human eye—beyond what is directly emitted by sunlight—by the use of appropriate fluorescent compounds that are incorporated into ophthalmic lenses and other light filters. According to the present invention, UV and visible light that would otherwise be absorbed and then converted to heat—as in the case of all previous art relating to sunglass lenses and ophthalmic lenses, in general—is absorbed and then, at least partially converted into near infrared fluorescence.

The objects of this invention are also to: a) specify the wavelength regions for light absorption and emission by the fluorescent compounds that provide as much photo-therapy for the eye—but without otherwise compromising vision, given that fluorescent light is a source of glare; b) identify and incorporate fluorescent compounds having the appropriate absorption and emission spectra according to a); and c) to incorporate the above fluorescent compounds into ophthalmic lenses that preserve the optical qualities for phototherapy of the eye described above.

A preferred embodiment for the objects of this invention is to identify materials that: a) selectively absorb UV and visible light; b) also have a high transmission of near IR light; c) the materials of a) and b) fluoresce or luminesce primarily over the region of wavelengths 600 nm to 1200 nm that matches—or falls within—the action spectrum for cytochrome C which has been associated with the repair of human cells; and d) to demonstrate that the preceding materials can be incorporated into ophthalmic lens materials. Thus, the excitation spectrum of the fluorophores should span the region 300 nm to 700 nm, and the fluorescence emission spectrum should be similar in shape to the action spectrum or optical absorption spectrum for cytochrome C and span the region of wavelengths between 600 nm and 1200 nm—or if not similar, fall within the region 600 nm to 1200 nm. In this way, sunlight energy with wavelengths between 300 nm and 700 nm that is absorbed by a light filter such as a sunglass lens or a light filter—that would otherwise convert this light into heat—will, instead, be converted into fluorescence. And this emission of near infrared light that will energize the cells of human tissue resulting in repair or therapy of ocular tissue.

Normally, light that enters the eye other than what is associated with what is being imaged is considered glare. Thus, an image of some object of interest and which is produced by reflection of sunlight of this object and which enters the eye and carries an image of the object to the retina will be compromised by extraneous light such as fluorescence—the latter being defined as glare.

Thus, it is an important consideration of this invention that the naturally-occurring benefits of repair that can arise from near IR fluorescence are possible because such fluorescence occurs in a region of wavelengths wherein the eye is not sensitive to such light that would otherwise be considered glare.

Several inherent factors can mitigate the performance of this invention: The Stokes Shift imposes practical limits on the wavelength differences between peak excitation and peak emission wavelengths. Very large Stokes shifts are reported as nominally 200 nm. This means that most fluorophores in light filters that are excited by light having wavelengths of 500 nm or shorter will not likely emit at wavelengths longer than 700 nm. Then if fluorescent materials are chosen with excitation maxima occurring in the HEV region of wavelength, a significant part of their emission maxima will likely occur in the visible part of the spectrum and this light will be perceived as glare because fluorescence is not associated with any image and so competes with the light carrying the image.

More accurately, there will be less materials available with Stokes shifts larger than 200 nm that would allow NIR fluorescence to occur if the excitation wavelengths fall within the UV or HEV region of wavelengths. However, some materials can be identified with very large Stokes shifts and can be used as an object of this invention. Furthermore, even if significant fluorescence occurs in the visible region of wavelength, it may not be perceived as significant glare provided that such fluorescence is limited to the red end of the spectrum (650 nm and longer) where the sensitivity of the eye is very low.

If a 'perception of significant glare' can be quantified, then a minimally acceptable level of fluorescence in the visible region can be set as follows: In the case of sunglass lenses, a haze value of approximately 1% or less is considered acceptable for the consumer by the lens industry. In this case, the haze is the result of scatter off of micron-sized particles by the visible part of the sunlight passing through the lens. Fluorescence can roughly be considered in the same light as haze. Thus a fluorescence intensity of approximately 1% of the light that enters the eye could be set as a maximum value to be tolerated. However, the sensitivity of the eye can also be factored into this maximum value as follows $$\text{Haze}_{FI} = F_\lambda \times S_\lambda \cdot \Delta\lambda / \Sigma I_\lambda \Delta\lambda$$

Where $F_\lambda$ is the fluorescence intensity at a specific wavelength; $S_\lambda$ is the sensitivity of the eye at that wavelength; at a specific wavelength; $I_\lambda$ is the intensity of the light passing through the light filter at that wavelength; and $\Delta\lambda$ is the wavelength interval.

Thus, the haze due to fluorescence—factoring in the overlap between the sensitivity spectrum of the eye and the fluorescence emission spectrum. For example, the eye has very little sensitivity at 650 nm; and still less at 700 nm; and hardly any beyond 750 nm. Thus the sum in the above equation for the haze should run between 600 nm and 750 nm. Beyond 750 nm, any near IR light that is enhanced by the articles of this invention will not contribute to glare; however, another essential aspect of this invention is that it is possible—and useful—to allow some light between 600 nm and 750 nm to be enhanced by the fluorescent compounds envisioned in this invention to because they may contribute significantly to photo-therapy.

Figure 4:
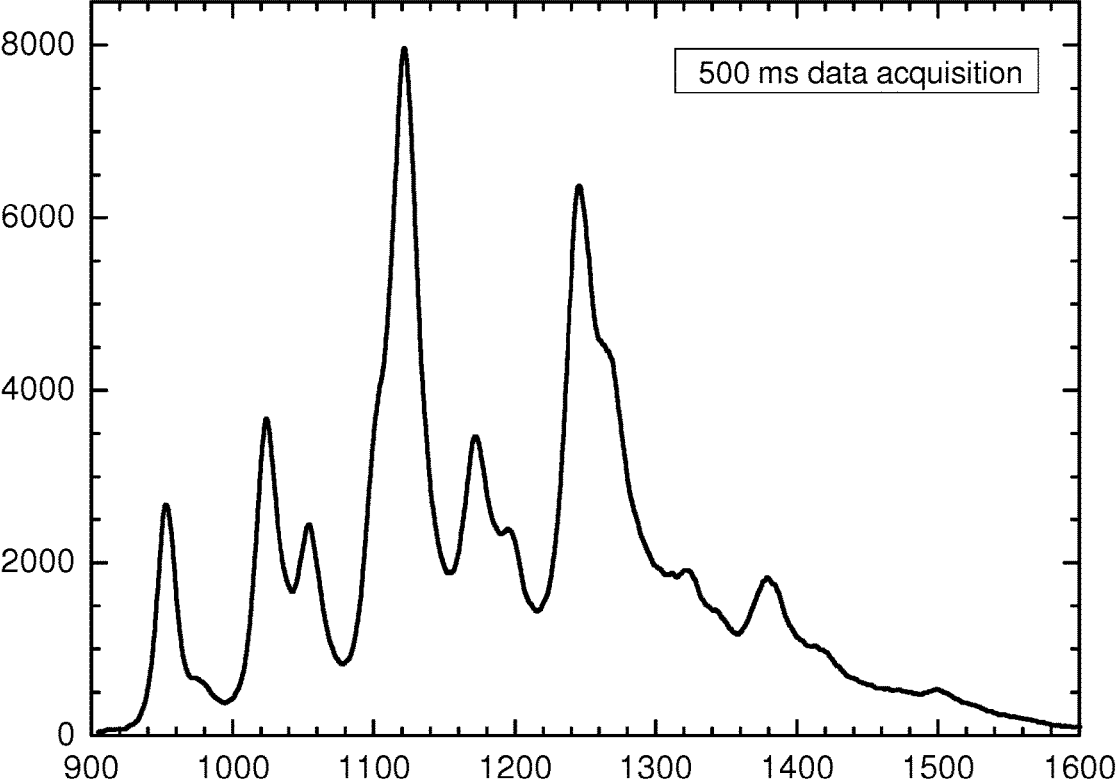
FIG. 4 is a graph that shows emission spectrum measured from a suspension of single-walled carbon nanotubes in aqueous media using laser excitation at 658 nm (Figure courtesy of Applied NanoFluorescence, LLC)

Organic dyes, quantum dots, and single-walled carbon nanotubes (SWNTs), have been employed for in vitro and in vivo biological imaging in the NIR region. SWNTs are a group of one-dimensional (1-D) macromolecular fluorophores, with intrinsic bandgap fluorescence emission between 0.9-1.4 μm upon excitation in the visible or NIR. The large Stokes shift makes SWNTs ideal probes for biological imaging with high contrast and low background. Thus far, SWNTs have been used as in vitro fluorescence tags for cell imaging, ex vivo imaging of tissues and organs, and in vivo imaging of normal organs as well as tumors. An example of the fluorescence of a SWNT is shown in FIG. 4 that could be used to realize the objects of this invention.

Another object of this invention is to create new materials or modify existing materials to increase the overall fluorescence or quantum yield for emission in the region 700 nm to 1200 nm that also have the properties of a) through c) inclusive of the preceding paragraph. Applicant notes there are several ways to cause such a modification: 1) the materials selected can be chemically of physically modified to increase their Stokes shift so that either shorter excitation wavelengths can be achieved for a given emission maxima, or so that longer emission wavelengths can be achieved for give excitation wavelengths; 2) the quantum efficiency can be increased using standard methods (for example, increasing/decreasing the rigidity of the host medium, etc.)

The fluorescent molecules or compounds of this invention can also be blended with common ophthalmic lenses in a thermoset lens casting process, or in an injection molding process commonly used to make sunglass lenses. In this way, the UV and HEV components of sunlight (or artificial light) are absorbed by the compound instead of being absorbed by the cornea or retina of the eye.

This objects of this invention can be realized by: A) selection of existing compounds and molecules that have the light-absorption and luminescence properties described above; or, B) by chemical modification of existing molecules to enhance the absorption and fluorescence to better conform to the properties described above.

A particular technical challenge of the present invention is the inherently-small Stokes shift (the difference in wavelength or frequency units between positions of the emission and absorption maxima) that is associated with fluorescence. Among the many existing fluorescent molecules and compounds, 100 nm is considered a large Stokes shift. Furthermore, the UV (300 nm to 400 nm) or HEV (400 nm to 500 nm) are both far removed from the near IR (here, 700 nm to 1200 nm). This means that within the UV and visible range of excitation wavelengths, it will be more common to identify a lens filtration system that involves fluorophores with absorption maxima at wavelength nominally greater than 600 nm. This means that most of the candidates for NIR fluorescence will involve emission wavelengths very close to the red end of the visible spectrum. In the case of ophthalmic lens applications, this presents an unwanted potential for glare because omnidirectional fluorescence of visible light competes with light that is carrying an image to the retina. On the other hand, the eye is much less sensitive to red light.

The literature cites other ways to achieve larger Stokes shifts useful for this invention: "A readily accessible new class of near infrared (NIR) molecular probes has been synthesized and evaluated. Specific fluorophores in this unique xanthene based regioisomeric seminaphthofluorone dye series exhibit a combination of desirable characteristics including (i) low molecular weight (339 amu), (ii) aqueous solubility, and (iii) dual excitation and emission from their fluorescent neutral and anionic forms. Importantly, systematic changes in the regiochemistry of benzannulation and the ionizable moieties afford (iv) tunable deep-red to NIR emission from anionic species and (v) enhanced Stokes shifts. Anionic SNAFR-6, exhibiting an unusually large Stokes shift of 200 nm (5,014 cm1) in aqueous buffer, embodies an unprecedented fluorophore that emits NIR fluorescence when excited in the blue/green wavelength region. The successful use of SNAFR-6 in cellular imaging studies demonstrates proof-of-concept that this class of dyes possesses photophysical characteristics that allow their use in practical applications. Notably, each of the new fluorophores described is a minimal template structure for evaluation of their basic spectral properties, which may be further functionalized and optimized yielding concomitant improvements in their photophysical properties."

Another NIR fluorescence system can consist of a complex whereby a 'donor molecule' absorbs light in the visible region of wavelength and then transfers its excited energy to an acceptor molecule which fluoresces in the NIR region of wavelength—as in the example below: "Energy transfer from photoexcited porphyrin molecules to single-walled carbon nanotubes (SWNTs) has been experimentally detected for samples in aqueous Triton X-100 micellar suspensions. Addition of SWNTs to micelle-suspended porphyrin results in strong quenching of porphyrin fluorescence. Measurements of concentration-dependent quenching and spectra suggest that this process arises from formation of ground state non-covalent complexes between porphyrins and SWNTs. Optical excitation of the porphyrin generates characteristic near-IR emission from the SWNTs, indicating efficient energy transfer within the complexes. This energy transfer is deduced to occur through a Dexter-type electron exchange mechanism. Complexation of SWNTs with organic photosensitizers provides a novel way of uniformly exciting a wide range of nanotube structural species in polydisperse samples using only a single excitation wavelength"

Selection and Preparation of the Fluorescent Dyes

The preferred embodiment of this invention is a single substance that has all of the desired properties although to some limited degree. Preferably, the fluorophores will have:

a) an average transmission of 1% or less of the UV light-weighted by the source emission spectrum;

b) an average transmission of 5% or less of the HEV light-weighted by the source emission spectrum;

c) a fluorescence emission selectively in the near IR between 600 nm and 1200 nm d) A quantum yield—defined as F=[number of photons emitted (600 nm to 1200 nm)/number of photons absorbed (300 nm to 700 nm)] greater than 0.1 e) Factoring in of overlap of sunlight spectrum (S1× starting at 750 nm $\Sigma$ $\alpha_\lambda S_\lambda / \Sigma S_\lambda$. $\alpha$ is the absorption spectrum of cytochrome C;

So, integrate from 1=500 nm to 750 nm gives about 325 w/m2 between 500 nm and 750 nm, or 0.0325 j/sec-cm2.

So after 100 sec—a reasonable therapy period of time—you have 3.25 j/cm2. —which is just inside the typical range of therapy 2-4 j/cm2.

So if all of the energy (or a significant part of it) between 500 nm and 750 nm can be converted into near IR instead of heat, then the idea is feasible.

Figure 3:
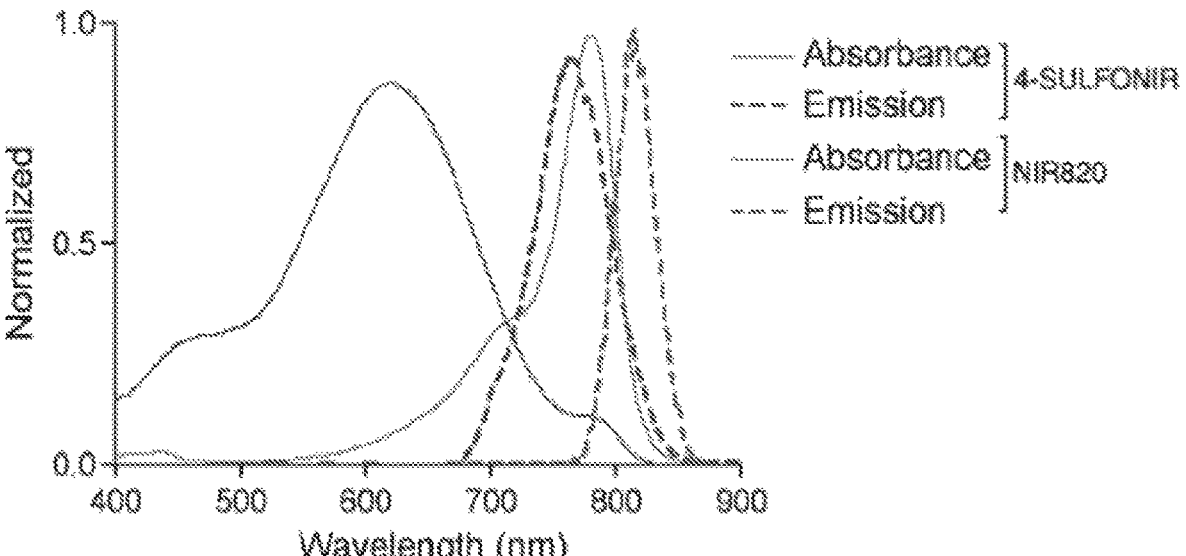
FIG. 3 is a graph that shows absorption and emission spectra of a commercially available fluorophore that absorbs light in the visible part of the spectrum and emits in a range of near infra red wavelengths that overlap the action spectrum of cytochrome C of FIG. 2.

According to FIG. 3, for the dye 4-SulfonIR, the principal absorption occurs within the wavelength region of 400 nm to 750 nm; and according to FIG. 4, the corresponding terrestrial solar intensity in the same region of wavelengths is (750 nm-400 nm)×(~1.4 W/m2 nm)~490 W/m2.

So, about ½ of the sun's energy lies between 400 nm and 750 nm (the other half of the sun's energy is distributed over the wavelength regions 300 nm to 400 nm; and 1200 nm to 2500—with the bulk of the energy between 1200 nm and 2500 nm. If 4-SulfonIR is used as a point of reference, it is possible to approximate the potential of the present invention to create light filters that significantly enhance the throughput of near IR energy by implanting fluorophores into these light filters. Assuming that approximately 75% of the light is absorbed, for example by dyes similar or better than the 4-SulfonIR dye and with a quantum yield of about 75%, then more than 50% of the energy of the visible light could be available as near IR energy for photo-therapy— over and above what might be transmitted in the near IR region, and over and above what might otherwise be absorbed over the region 400 nm to 750 nm and converted into heat instead.

Assuming a combination of dyes could be identified, it is possible to absorb light in the region between 350 nm and emit throughout the region between 700 nm and 1200 nm and reach higher energies, or fractions of the total near IR energy

ALTERNATIVE EMBODIMENT

In an alternative embodiment, the object of this invention is achieved through the preparation of a mixture of fluorophores each having an excitation band (absorption maxima) located at a different wavelength within the UV range (UVA, UVB, UVC) and visible light range (400 nm to 700 nm) and with corresponding emission band in the near IR spanning the range from 700 nm to 1200 nm.

Generally, hydrophobic fluorophores can be dispersed in organic solvents along with hydrophobic polymers—such as polymethylmethacrylate—after which the solvent is allowed to evaporate and the fluorophore is encapsulated within the polymer. The composite can then be added to any standard skin care formulation. Likewise, hydrophilic fluorophores can be co-dissolved in water along with hydrophilic polymers—such as polyvinyl alcohol; and, again, the solvent (water in this case) can be allowed to evaporate leaving the fluorophore encapsulated within the polymer Endogenous Chromophores as Fluorescent Agents An alternative embodiment of the present invention utilizes chromophores endogenous to humans or modifications thereof as fluorescent agents to effect PBM in a broader wavelength range. According to the present invention, those fluorescent agents increase the overall fluorescence or quantum yield for emission in the region 700 nm to 1200 nm that also have the suitable properties referred to above. Those compounds have auto-fluorescence wherein the emission wavelengths correspond to one or more of the wavelength bands that are associated with Photo-biomodulation (PBM).

The endogenous chromophores, are preferably chromophores that are inherently photoprotective—and preferably with an Eye Protection Factor (EPF) of greater than 5 for sunglass lenses and greater than 1.2 for computer lenses and reading lenses. Such molecules are wavelength selective in that their optical absorption is roughly proportional to the photochemical damage they inflict and falls in the region of high energy wavelengths—what the eye associates with the colors violet and blue. These include—but are not limited to—melanin, lipofuscins, lutein, protoporphyrin, retinal, tryptophan, the oligomerization of 3-hydroxykynurenine and the oligomerization of tryptophan. Further, because UV and HEV-absorbing molecules often have a limited stokes shift, chemical modification may be facilitated by reaction with a second endogenous molecule that results in an extended electron delocalization. As a result, a bathochromic shift in the fluorescence emission toward the desired red and near infrared emission of the reaction products occurs. For example, lipofuscins—age-related pigments of the retinal pigment epithelium—display a red fluorescence. The fluorophore in lipofuscins has been identified as A2E, which is a reaction product of two molecules of vitamin A aldehyde (retinal) and one molecule of phosphatidyl ethanolamine, and represents a bathochromic shift in fluorescence emission relative to that of retinal.

Using the aforementioned reaction in the model:

X (amine-containing endogenous chromophore/fluorophore)+retinaldehyde+acetic acid red emitting fluorophore, According to the present invention, retinal is reacted with other endogenous, amine-containing chromophores or fluorophores. The following stoichiometry is used: 1 mol ratio of X (amine-containing fluorophore):2 mol ratio of retinal:1 mol ratio of acetic acid In representing the reactions between retinaldehyde and the amine-containing endogenous chromophores, the following abbreviations are used:

A=retinal=retinaldehyde, vitamin A aldehyde trp=tryptophan

A2E=N-Retinyliden-N-Retinylethanolamine

Figure 6:
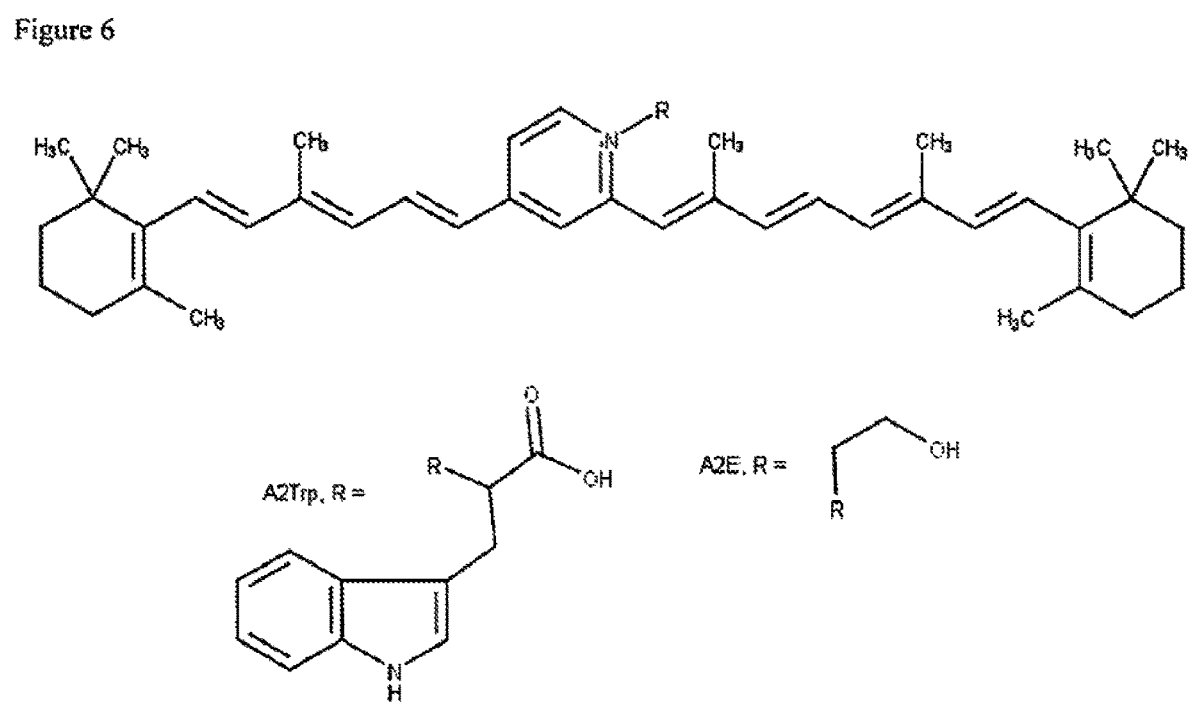

A2X=red fluorophore reaction product, composed of 2 retinal units and 1 amine-containing unit X=photoprotective endogenous chromophore, possessing an amine Schematically, the preceding can be represented by the general structures shown in FIG. 6, wherein the general structure of the A2X compound is shown, and where R is the endogenous, amine-containing chromophore selected to react with retinal. R can be: melanin derived from tyrosine, L-dopa or other melanin precursors for example; Ocular lens pigment derived from kynurenine, hydroxykynurenine, 3-hydroxykynurenine or from tryptophan, hydroxytryptophan; amino acids or other amine containing monomeric units, including but not limited to Trp, 3OHK, Tyr, 5-HTP, Tryptamine. or any metabolites thereof. Also included are argpyrimidine (ArgP) and the other UV-absorbing chromophores associated with other pigments found in the ocular lens and in the ocular retina, choroid and retinal pigment epithelium; they also include advanced glycation end products (AGEs);

The fluorescence emission spectra of the products of the combination of retinal with several amine-containing endogenous molecules and their were recorded at the excitation wavelengths of: 350 nm; 400 nm; 425 nm; 450 nm; 475 nm; 500 nm; 525 nm; 550 nm; and 600 nm. All fluorescence measurements were made with Perkin-Elmer Spectro-fluorometer LS-5 and with quartz cuvettes with 1-cm path lengths.

In another embodiment of the present invention, endogenous fluorophores that already display PBM auto-fluorescence are used. These include A2E (N-Retinyliden-N-Retinylethanolamine), ceroid, and more generally, advanced glycation end-products (AGEs), porphyrins and age pigment-like fluorophores (APFs). Various amine-containing compounds and their reaction with secondary aldehydic products of oxygen free radical-induced oxidation, particularly lipid peroxidation. They also include the monomeric derivatives of kynurenine, hydroxytryptophan (OH-Trp), N-formylkynurenine (NFK), kynurenine (Kyn), hydroxykynurenine (OH-Kyn) and their residues argpyrimidine (ArgP) and the other UV-absorbing chromophores associated with other pigments associated with the ocular lens and the ocular retina, choroid and retinal pigment epithelium; they also include advanced glycation end products (AGEs).

Incorporation of the Fluorescent Dyes into Light Filters

According to the present invention, light filters are disclosed having transparent substrates with the UV and HEV absorbing Fluorophores or the UV and HEV absorbing Phosphores placed on the surface of the substrate or incorporated in the substrate. In the case of skin care products, the fluorophores or phosphores are preferably incorporated in the substrate.

It should be noted, that because of the present invention, the field of eye care will focus not only to damage but to repair also and to distinguish clearly between damage and repair and to offer more repair options to people.

The following examples further illustrates the invention but are not to be construed as limitations on the scope of the invention contemplated herein.

Example 1

Figure 5:
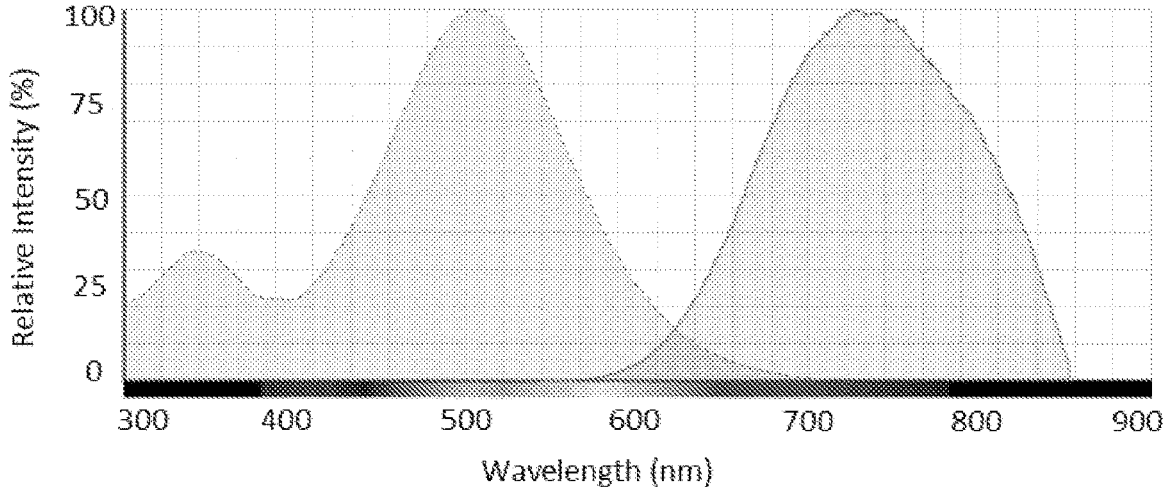
FIG. 5 is a graph that shows absorption and emission spectra of a commercially available fluorophore (Life Technologies) that absorbs light in the visible part of the spectrum and emits in a range if near infrared wavelengths that overlap the action spectrum of cytochrome C of FIG. 2.

A coating comprising a fluorescent dye with near IR emission over a transparent substrate was made as follows: 0.074 g of polymethylmethacrylate was co-dissolved with a solution of N-(3-triethylammoniumpropyl)-4-(6-(4-(diethylamino)phenyl) hexatrienyl)pyridinium dibromide, obtained from Life Technologies as the fluorescent dye. (1 mg of dye dispersed in 1.3 ml of toluene) to yield a solution of PMMA (0.065%) and dye (77%). 0.25 microliters of this solution was deposited onto a clear acrylic sheet 2 mm thickness. The toluene was allowed to evaporate at room temperature (about 22 degrees C.) to form a solid, thin film approximately 20 mm in diameter. The excitation/emission spectrum of the fluorescent dye is shown in FIG. 5.

Example 2

A coating similar to Example 1 was prepared using Quantum Dots (1 mg of non-polar non-functionalized, dodecanethiol coated, heavy metal free CuInS2/ZnS fluorescent nanocrystals, Catalog No. CIS-690-P-1 purchased from AC Diagnostics, and dispersed in 1.3 ml of toluene) to yield a solution as the fluorescent dye. The emission spectrum of this fluorescent dye has a maximum at 690 nm and an excitation band throughout the visible spectrum.

Example 3

In this example, 54 mg of Retinal, purchased from Sigma-Aldrich (98% grade), and 5.25 mg of acetic acid was added to 3.5 ml of 200 proof molecular biology grade ethanol and stirred until fully-dissolved. The sample was covered from light until the fluorescence measurements were made.

Figure 7:
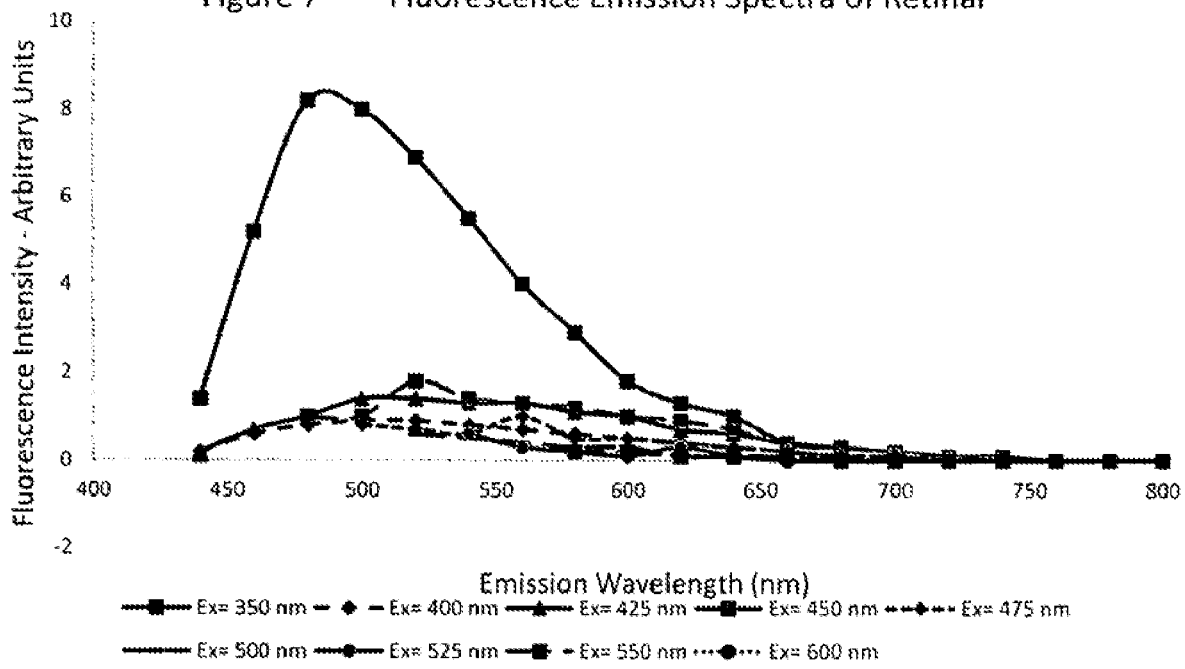
FIG. 7 is a graph that shows the fluorescence emission spectra of retinal wherein a prominent emission peak is seen at approximately 490 nm for an excitation wavelength of 350 nm.

The fluorescence emission spectra for Example 3. are shown in FIG. 7. A prominent emission peak is seen at approximately 490 nm. When the emission intensity is scaled so as to make the maximum arbitrary units have a lower value of 2, other smaller emission peaks are seen at 525 nm for excitations by light at 425 nm; and at 565 nm for excitations at 475 nm and are considered noise.

Example 4

Figure 8:
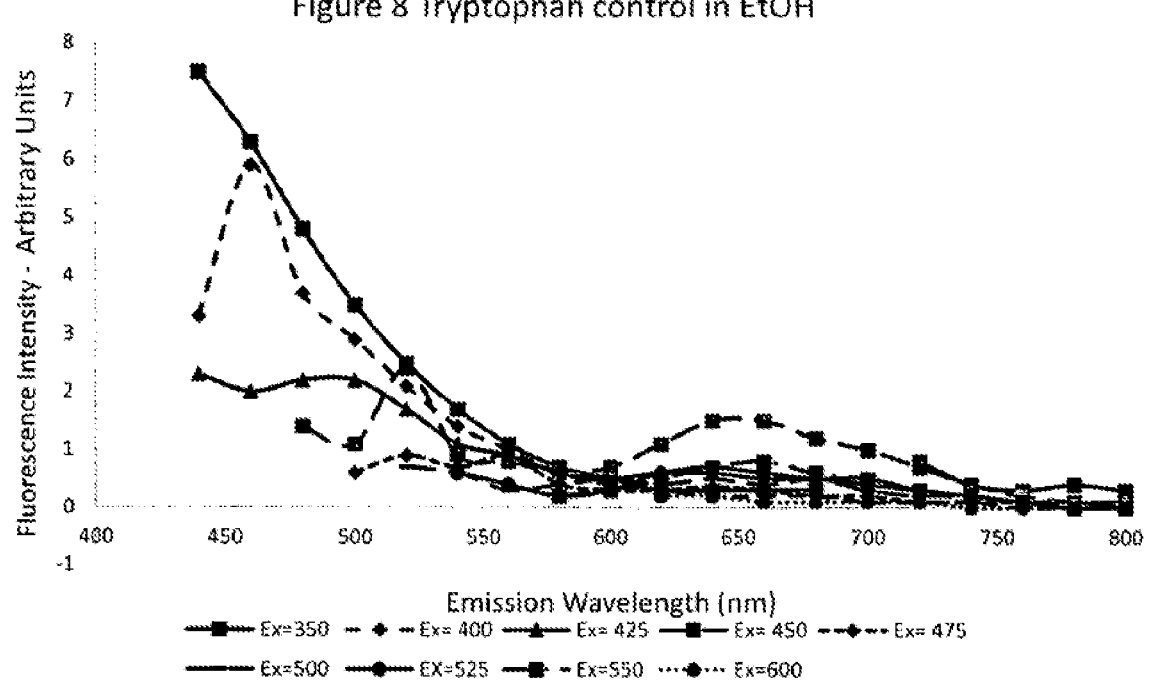
FIG. 8 is a graph that shows the fluorescence emission spectrum of tryptophan in ethanol. Tryptophan is known to have a single emission maximum. It may be represented at 348 nm. The small emission values, common to both samples of different molecules is considered background noise or artifacts.

In this example, 18 milligrams (18 mg) of tryptophan dissolved in 3.5 ml of ethanol and stirred. 8 microliters of the soluble component was added to 3 ml of ethanol for the fluorescence measurements. The fluorescence emission spectra for Example 4. are shown in FIG. 8. Tryptophan is known to have a single emission maximum. It may be represented at 348 nm. Other smaller emission peaks are seen also at 525 nm for excitations by light at 425 nm; and at 565 nm for excitations at 475 nm. These small emission values, common to both samples of different molecules is considered background noise or artifacts.

Example 5

In this example, 56 mg of Retinal, purchased from Sigma-Aldrich (98% grade), and 5.25 mg of acetic acid and 17 mg of tryptophan was added to 3.5 ml of 200 proof ethanol and stirred. The tryptophan did not fully dissolve initially; it slowly reacts and is pulled into solution. The solution was allowed to stir for 72 hours while covered from light until the fluorescence measurements were made.

Figure 9:
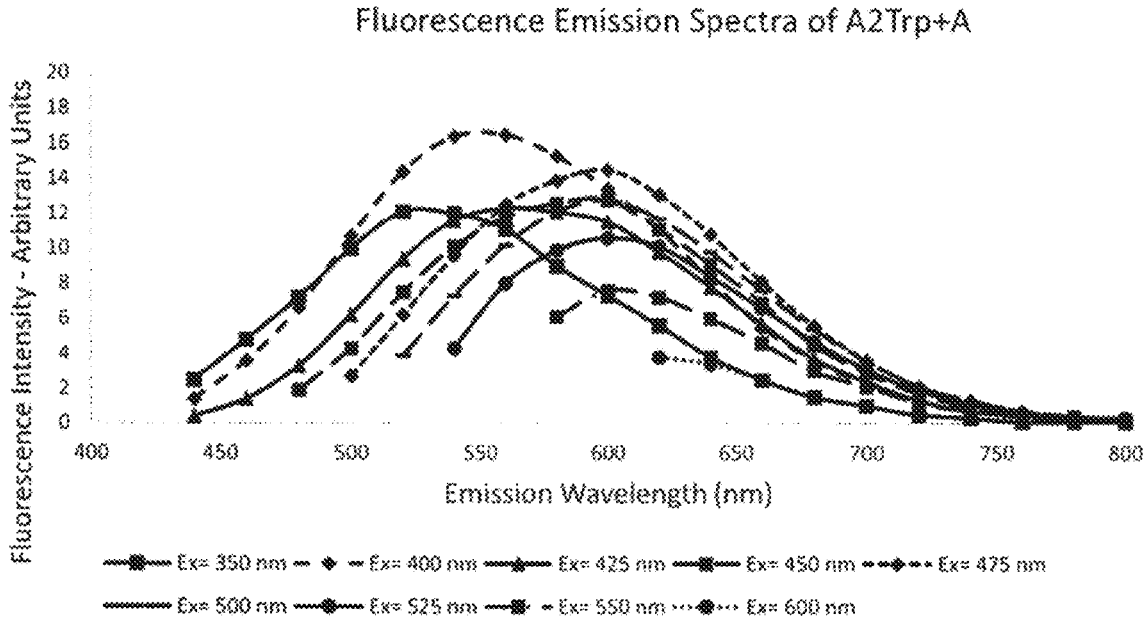
FIG. 9 is a graph that shows the fluorescence emission spectra of A2Trp+A.

The fluorescence emission spectra of Example 5 are shown in FIG. 9. The fluorescence intensity of this sample increased significantly relative to both the tryptophan sample and the retinal samples; significant to the goals of this invention, an emission shift occurred toward the red end of the spectrum—specifically at 600 nm—relative to that of both retinal and tryptophan. This result demonstrates an essential feature and object of this invention: to react two endogenous chromophores or fluorophores with each other, causing a red shift in their fluorescence toward the cytochrome-C-activating wavelengths. Furthermore, the emission maxima at 600 nm for multiple excitation wavelengths (450 nm, 475 nm, 500 nm, and 525 nm) indicate a single new species that obeys Kasha's rule. The emission due to an excitation of 550 nm is further red-shifted to about 610 nm. There is also enhanced fluorescence between 670-700 nm for many of the excitation wavelengths, and although these emissions are not as prominent as at 600 nm, they are significant to the invention as this region of the red and near infrared light enhances the activity of cytochrome-C Further evidence that a chemical reaction has occurred between retinal and tryptophan to create a new compound with a bathochromic shift is the emission maxima at 525 nm for an excitation of 350 nm and at 550 nm for Ex=400 nm, 560 nm for Ex=425 nm. Most notably this sample display a red fluorescent beam when irradiated with a 405 nm laser.

Example 6

In this example 6, 55 mg of Retinal, purchased from Sigma-Aldrich (98% grade), and 5.25 mg of acetic acid and 18 mg of an oligomer OLPTM (provided by Photoprotective Technologies and derived from tryptophan and Benzoyl peroxide in THF) was added to 3.5 ml of 200 proof ethanol and stirred until fully-dissolved and covered from light until the fluorescence measurements were made.

Figure 10:
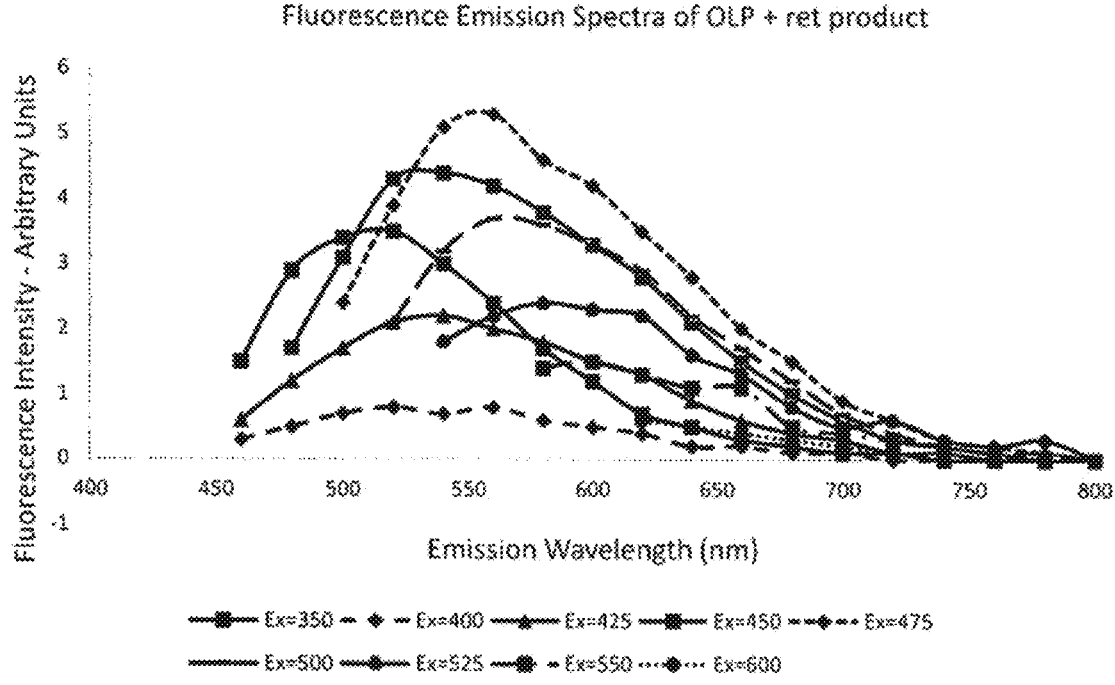
FIG. 10 is a graph that shows the fluorescence emission spectra of OLP+ret product.

The fluorescence emission spectra are shown in FIG. 10. There is an overall decrease in the fluorescence intensity. The fluorescence emission of the oligomerization product (OLP) reacted with retinal is less red-shifted relative to that for the tryptophan-retinal product for excitation wavelengths of 450 nm to 525 nm while the emission wavelengths for excitation wavelengths of 550 nm and 600 nm remain at longer than 600 nm. Although the reaction between endogenous retinaldehyde with phosphatidyl ethanolamine was a template for the Applicants' examples to result in a red fluorophore, similar reactions between other naturally-occurring chromophores and fluorophores are possible.

Example 7

Figure 11:
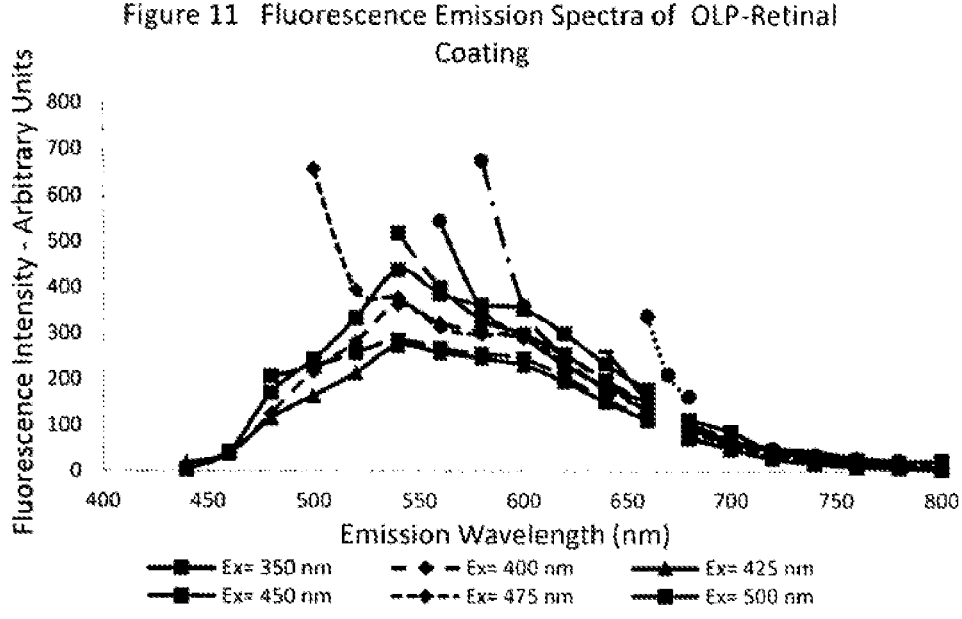
FIG. 11 is a graph that shows the fluorescence emission spectra of OLP-Retinal Coating.

A light filter was made from the product of Example 4 as follows: 55 mg of Retinal, purchased from Sigma-Aldrich (98% grade), and 5.25 mg of acetic acid and 18 mg of an oligomer OLPTM (provided by Photoprotective Technologies and derived from tryptophan and Benzoyl peroxide in THF). 100 ul of the OLP product was dispersed in 2 ml of a liquid waterborne primer (#7130 made by SDC Corporation). The solution was applied to a glass microscope slide and the solvent was allowed to evaporate to form a coating of approximately 20 microns. The slide was baked in an oven at 60 C for ½ hour. The glass slide was cut so that it could be placed at a 45 degree angle inside the cuvette housing of the spectrofluorometer The fluorescence of the coating of Example 7 is shown in FIG. 11. Most notable is the significantly-enhanced fluorescence of the film relative to the same material of FIG. 5, which is in the liquid state. The fluorescence of the solid coating relative to the liquid solution of Example 6. represents an increase by a factor of about two orders of magnitude in and was not expected; this may allow more flexibility in terms of making practical light-filtering devices that can provide PBM.

While the red and near IR PBM fluorescence has been achieved as a result of the chemical modifications described in the preceding examples, there is, however, unwanted fluorescence remaining in the visible part of the electromagnetic spectrum—and in particular—where the eye is most sensitive. In practical cases such as eyewear, this presents a risk for unwanted glare. Therefore, a third embodiment of this invention is the minimization of fluorescence between 400 nm and approximately 600 nm. A reduction in fluorescence over this wavelength can be achieved with a light filter placed between the light source that excites the auto-fluorescent compound and the said fluorescent compound—incorporated into a transparent polymer coating laid over the surface of a sunglass lens.

Example 8

While auto-fluorescence-based PBM is desired for ophthalmic lens applications, it is also undesirable to have a strong, glare-causing fluorescence in the region between 400 nm and 550 nm—and especially at 550 nm, where the eye is most sensitive. It is also a significant aspect of this invention to reduce the fluorescence emission between 400 nm and 550 nm by the use of wavelength-selective, photoprotective filters which are non-fluorescent. In this example, a thin film of melanin with a luminous transmission of about 70% was placed over the surface of the coating of Example 7.

Figure 12:
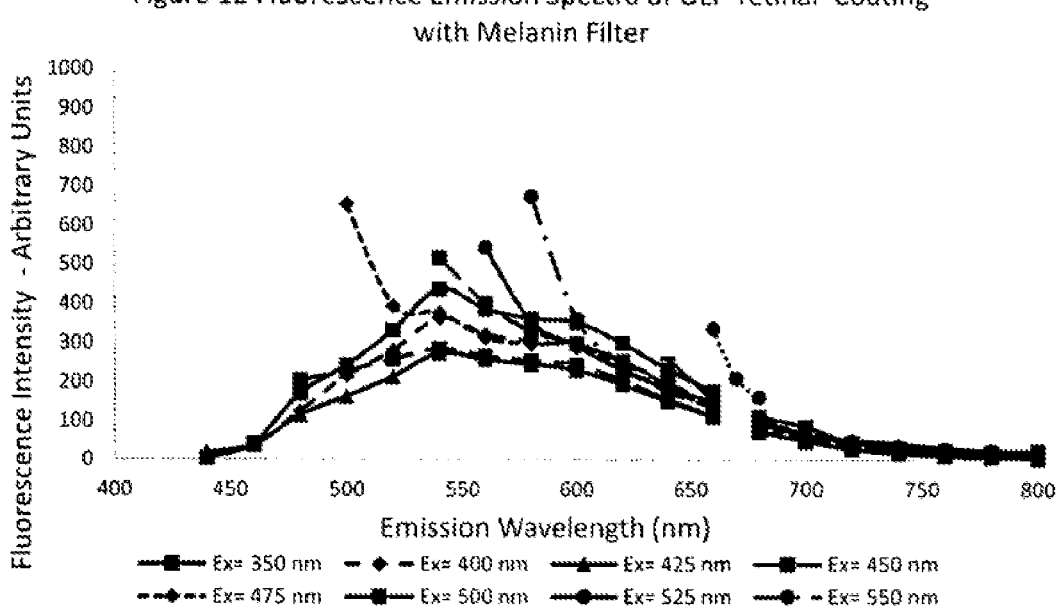
FIG. 12 is a graph that shows the fluorescence emission spectra of OLP-retinal Coating with Melanin Filter.
Figure 13:
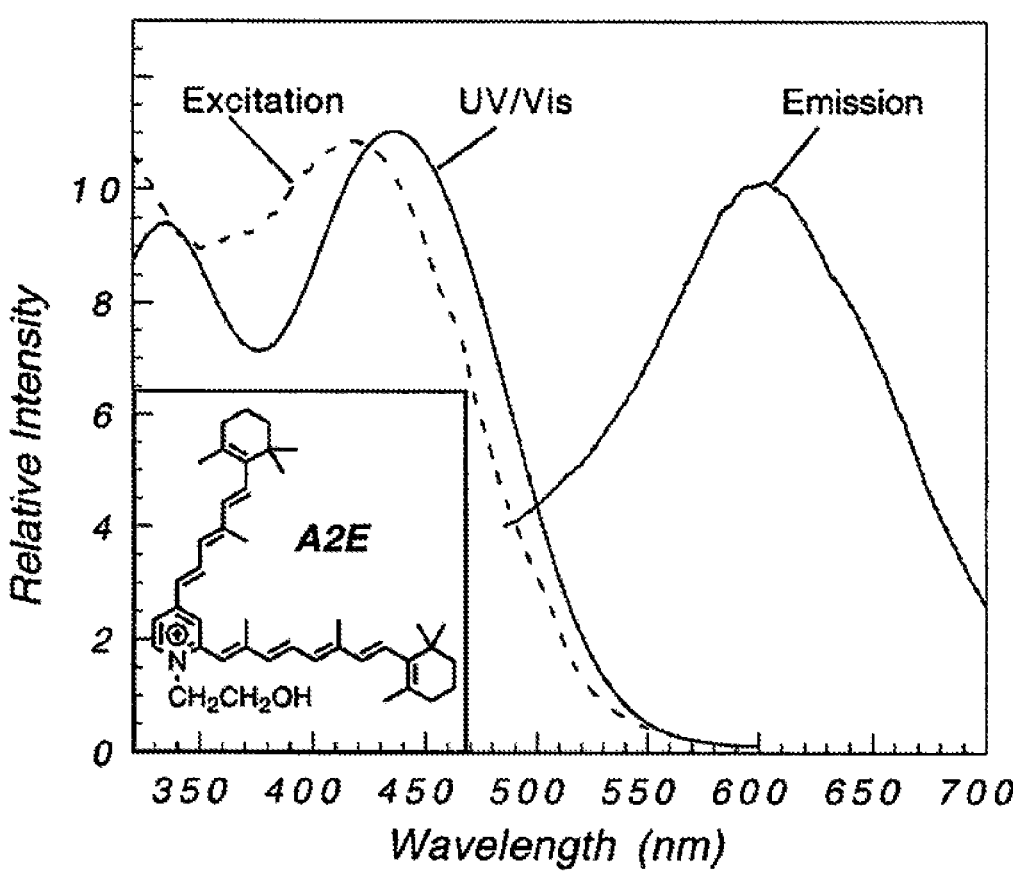
FIG. 13 is a graph that shows the fluorescence excitation and emission spectrum of A2E.

The optical absorption of the melanin film favors filtration of the shorter wavelengths. The sample was placed in the spectrofluorometer cuvette housing and oriented so that the excitation beam passed through the melanin film before it reached the fluorescent coating. The resulting fluorescence spectrum is shown in FIG. 12. The blue end of the fluorescence emission intensity of the coating filtered by the melanin film is diminished relative to the unfiltered coating as evidenced by examining the ratio of the corresponding emissions at 700 nm relative to 450 nm—or even relative to 550 nm. However, the use of extraneous filters to eliminate or significantly reduce the fluorescent light at 550 nm will require a more aggressive filtration of the light between 400 nm and 550 nm and fluorescence quenching may be preferred.

Alternatively, the auto-fluorescence can be quenched over a selected region wavelengths—for example, between 400 nm and 600 nm, but are not limited to: the addition of selected metal ions—for example transition metal ions—and more generally, excited state reactions, energy transfer, complex-formation and collisional quenching.

This feasibility of this approach is further supported by the observation that the fluorescence of the samples presented in this invention have at least two primary fluorescent moieties, and this allows the selective quenching of the fluorescence in the shorter wavelength fluorophores relative the red-shifted fluorophores.

Another example is that of A2E itself. A2E, a component of lipofuscins is known to have negative effects on RPE cells which includes inducing apoptosis; furthermore, excessive amounts of lipofuscin accumulation are believed to contribute significantly to the advancement of macular degeneration. Applicants view A2E as potentially positive on the other hand, by providing localized PBM to the same cells and tissues that are being damaged.

A2E represents another embodiment of the invention wherein a large Stokes shift is evident. This allows the molecule in a device of this invention to embody photoprotection—by virtue of its ability to absorb blue light; and to embody PBM—by virtue of its ability to fluoresce in the red and near IR parts of the spectrum. This is shown in FIG. 8 published from a journal article. Therefore, the following example is described.

Example 9

Figure 14:
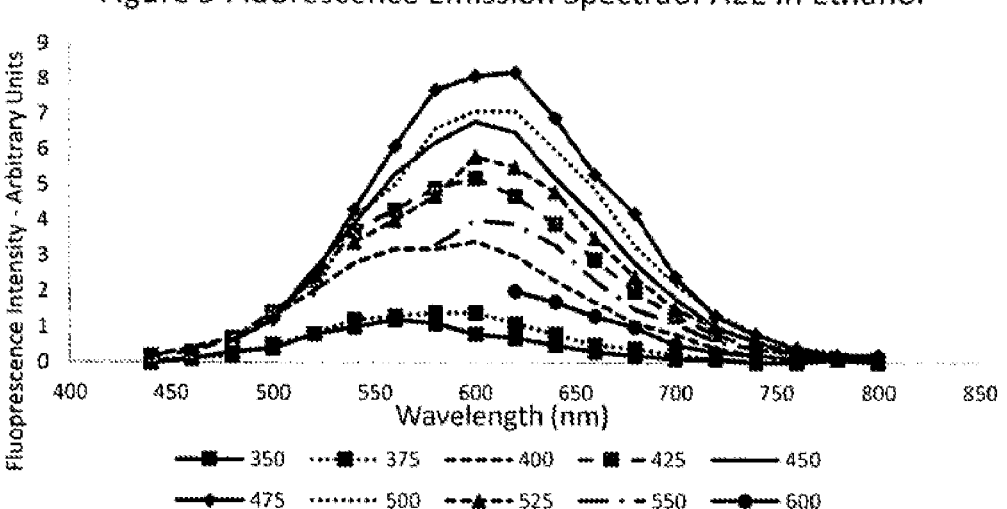
FIG. 14 is a graph that shows the fluorescence emission spectra of A2E in ethanol.

9.5 micro-liters of acetic acid, 100 mg of retinal, 9.5 micro-liters of ethanolamine were added to 3 milliliters of ethanol and stirred under red light for 24 hours to form a stock solution of A2E. 20 ul of the stock solution of A2E was then dissolved in 7 ml ethanol and added to the cuvette to make the fluorescence recordings. The fluorescence spectrum is shown in FIG. 14. The fluorescence compares well with that of the published spectrum and follows Kasha's law. The spectra also show emission that is present in the red and near infrared wavelengths—although relatively small.

Example 10

Figure 15:
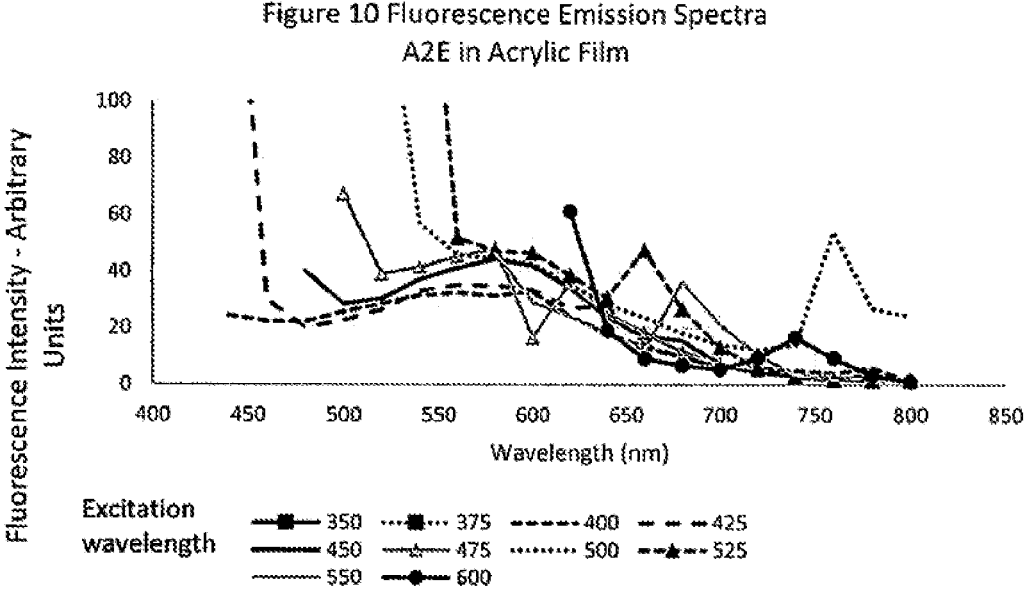
FIG. 15 is a graph that shows the fluorescence emission spectra of A2E in Acrylic Film.

A film was made from the product of the reaction of Example 9 and cast onto a glass slide as follows: 6 grams of optical grade acrylic was dispersed in 50 ml of methyl ester ketone to form a stock solution of acrylic. 40 ul of A2E from the stock solution of Example 9 was dissolved in 2 ml of the stock solution of acrylic and several drops of this final solution was used to cast a film on glass microscope slide. The film was heated at 50 degrees C. for 10 minutes and placed into the cuvette housing of the spectrofluorometer and the emission spectrum was recorded and is shown in FIG. 15. As with the film of Example 7, the fluorescence of the film is enhanced by a factor of at least 6. There is a slight shift in the emission maxima toward the shorter wavelengths. However, there is also an emission bands evident at 760 nm from an excitation of 500 nm—representing a very large Stokes shift.

As regards the use of endogenous fluorophores, according to the present invention, the fact is underscored that while the principal focus of this invention is on endogenous fluorophores that react chemically with each other to form new molecules that fluoresce according to the special properties and features of PBM, it is also true that the aforementioned new molecules can no longer be identified by the names of either of the reactants that were used to make the new molecules. Therefore, the molecule that results from the reaction between retinal and tryptophan, for example, should no longer be considered retinal or tryptophan.

Further, as regards the use of endogenous fluorophores and the applicable wavelengths effecting phototherapy, the additives of this invention will selectively absorb UV, HEV and visible light and convert the excited state energy associated with this absorption into fluorescence. And furthermore, the fluorescence emission spans the wavelength range primarily from 700 nm to 1200 nm—the wavelength region of absorption by cytochrome-C (FIGS. 3 and 4)—but to also include the region from 600 nm to 1200 nm.

In 2006 it was published that PBM occurs over the wavelength region from at least 600 nm to 950 nm. The graph in FIG. 16 shows the specific action spectrum for this recent publication and it is clear that PBM is also operative between 860 nm and 960 nm. Current medical science therefore confirms that the wavelength region for PBM extends from 600 nm to at least 960 nm. According to the present invention, however, it is noted that PBM is theoretically operative up to 1200 nm where absorption by water in the human body presents an optical barrier and that range is covered by the fluorescent agents and filters of the present invention.

The agents disclosed herein are used in connection with any Light Filters as the term is defined above in the definition section which includes, but is not limited, to Ophthalmic Lenses (as the term is defined in the definition section above), Skin Care Products (as the term is defined in the definition section above) and any product that is used to filter light such as window of any kind (building window, automobile window, airplane window, etc.), light fixtures, transparent umbrellas, head covers and helmets, etc.

While the detailed description of the invention and the examples make reference primarily to achieving PBM through fluorescence excited by either sunlight or by artificial light sources, it should be understood that, according to the present invention, similar effect can be achieved by the use of dyes or molecules that phosphoresce, phosphorescence being another form of luminescence. While the invention is described with respect to specific embodiments, modifications thereof can be made by one skilled in the art without departing from the spirit of the invention. The details of said embodiments are not to be construed as limitations except to the extent indicated in the following claims.

What is claimed is:

1. A light filter comprising:

a luminescent dye that is a synthetic version of a lipofuscin, an endogenous, naturally-occurring, compound found in the cells and tissue of humans that has a red and near infrared luminescence within the wavelength range from 600 nm to 1200; and a transparent substrate which is a skin care product.

\* \* \* \* \*